United States Patent [19]

Virtanen

[11] 4,154,561
[45] May 15, 1979

[54] DEVICE FOR MAKING MOLDED BOATS AND THE LIKE OF REINFORCED PLASTIC MATERIALS

[76] Inventor: Aate A. Virtanen, SF-36240 Nattari, Finland

[21] Appl. No.: 884,608

[22] Filed: Mar. 8, 1978

[51] Int. Cl.² ............... B29C 1/16; B29D 3/02; B29C 6/00
[52] U.S. Cl. .................. 425/73; 425/470; 425/128; 425/453; 425/404
[58] Field of Search ............ 425/73, 74, 75, 470, 425/128; 264/313

[56] References Cited

U.S. PATENT DOCUMENTS

| | | | |
|---|---|---|---|
| 2,254,262 | 9/1941 | Bratring | 425/73 X |
| 2,779,056 | 1/1957 | Ligon | 425/73 X |
| 2,973,790 | 3/1961 | Huetter | 425/73 X |
| 2,975,470 | 3/1961 | Snelson et al. | 425/73 X |
| 3,103,254 | 9/1963 | Stedman | 425/73 X |
| 3,543,335 | 12/1970 | Meyer | 425/128 |
| 3,806,304 | 4/1974 | Tighe | 425/470 |
| 3,832,107 | 8/1974 | Cox et al. | 425/73 X |
| 3,832,745 | 9/1974 | Dorfman | 264/313 X |
| 3,999,911 | 12/1976 | Matsubara | 425/73 |

Primary Examiner—J. Howard Flint, Jr.

[57] ABSTRACT

A device for the production of reinforced molded plastic products such as small boats and the like, comprising molds mounted on an endless conveyer which is enclosed in an at least partly gas-tight chamber, for forming the products with hardening and subsequent curing in the molds themselves, the chamber having work access openings at least at a lower part of one wall, thereby providing a working space, and including means to exhaust gases that evaporate from the raw materials used for the plastic products.

11 Claims, 8 Drawing Figures

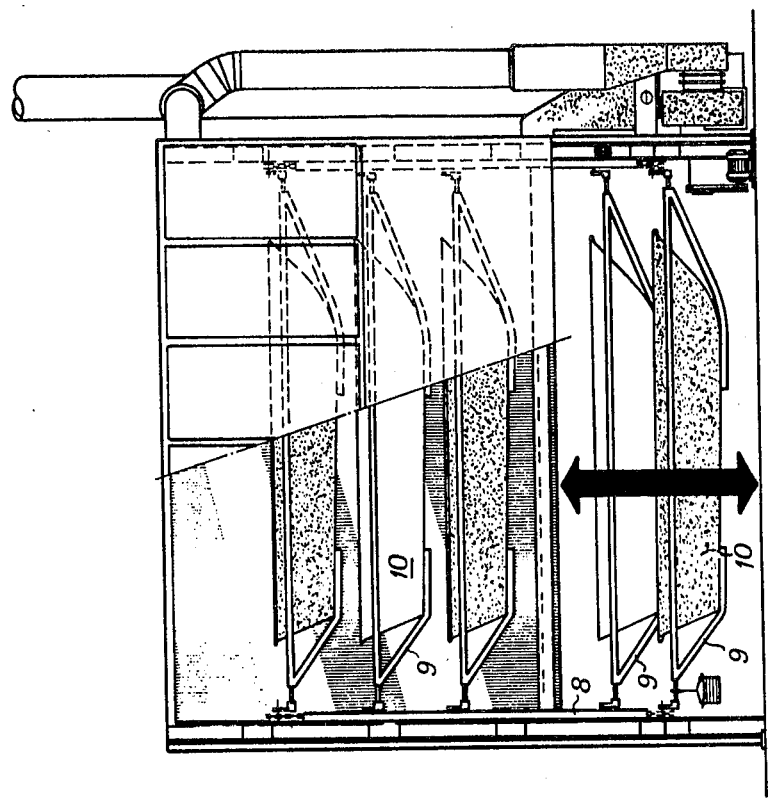
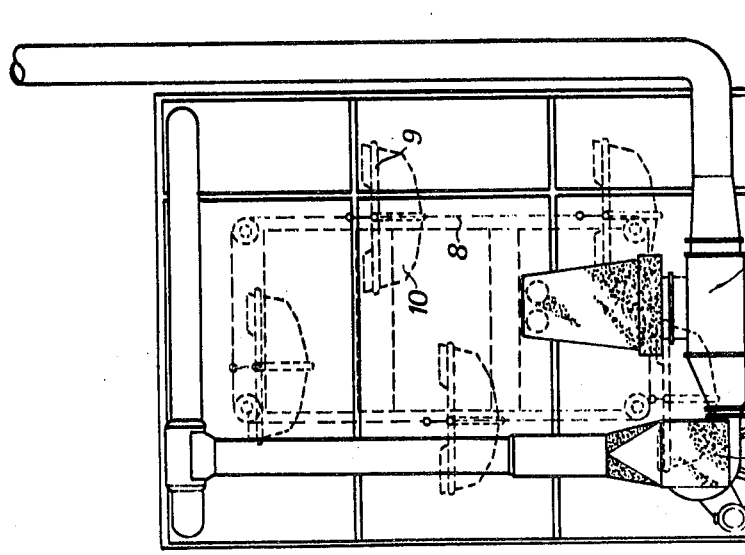

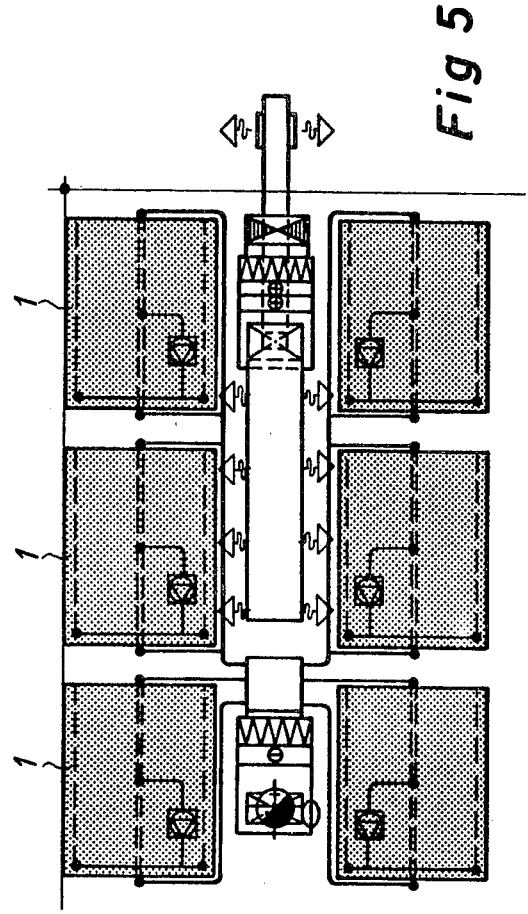
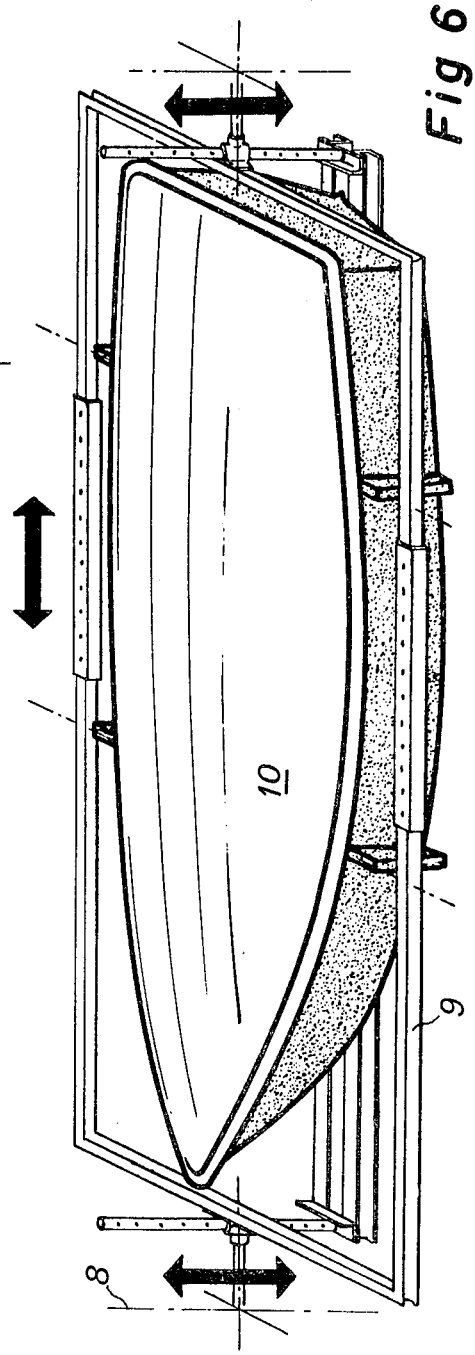

DEVICE FOR MAKING MOLDED BOATS AND THE LIKE OF REINFORCED PLASTIC MATERIALS

The invention relates to a device for making molded products as boats, containers and the like of reinforced plastic materials. The device comprises a conveyor carrying successively arranged forms or moulds through several phases or steps so that in the first step the materials, as glass fibre mats and a hardenable resin material, are brought on the surface of the moulds in one or several layers and then during the following steps the material is cured and hardened until the ready boat hull and the like is removed from the mold in the last step.

When making such products there is known a procedure with which smoothly finished forms or moulds are used, so that the shape and the surface finish of the forms will correspond the shape of the product. Eg. in making boats of reinforced plastic material, there is used a mould having the shape of the boat hull and with a smooth surface finish. The boat hull is then made by spreading the plastic material as well as the reinforcing material e.g. a glass fiber mat in one or several layers on the surface of the mould, after which it is left for some time to harden. This hardening procedure takes place through a chemical reaction caused by a hardener substance added to the plastic material before the spreading. After the hardening the completed boat hull is removed from the mould and brought into the assembling and other finishing stages.

As far as there is a serial production of boats or other corresponding reinforced plastic products in question, a great number of moulds or forms is needed. The transport and the stocking of the moulds as well as the manipulation and conveying during the working steps however requires relatively much time and work, which limits the production and increases the costs. There is also a need for a considerable floor area for stocking as well as for working purposes, also increasing the production costs.

With the common manufacturing procedures the operational stages are arranged to be done on the same plane on the factory floor so that the moulds are conveyed successively on a track or on a conveyor step by step from one stage to the other until the boats or other products are finished. Thus there are many serious defects with this procedure. The plastic materials used, such as e.g. styrene plastic, vaporizes poisonous gases requiring thus protective devices for the workers and a very effective air conditioning for the whole factory room where this kind of work is done. The costs of an effective air-conditioning are very high, particularly if the air-conditioned room is large. Also the heat loss becomes very high particularly in the cold seasons.

The object of this invention is to set forth a device by means of which the making of the products becomes more efficient and economical.

According to main characteristics of the invention the device comprises an endless conveyer on which moulds for making reinforced plastic products are suspended or supported successively, equally spaced, and the conveyor is brought into a periodical motion through several positions. One of the lower positions is arranged as a loading position and the other lower position as a product removing position.

The conveyor is enclosed in a hood the lower part of which has openings to form a working place for loading the raw materials and for removing the ready products.

The hood is preferably provided with extraction fans or similar air conditioning means to cause an air stream through the hood, thus extracting the vapourising gases of the raw materials that are used during manufacture.

According to other characteristics of the invention the hood is preferably provided with a heat-recovery radiator by means of which most of the heat in the extracted air is recovered and returned to the primary air. This increases the economy of the device.

According to further characteristics there are provided regulating valves which automatically adjust the amount of extracted air to the percentage of vapourized gases e.g. of the styrene vapourized from the products or the raw materials.

According to still further characteristics the hood can be provided with a heated-air for causing circulation of the air in the hood for hardening the products. This fan is preferably steplessly adjustable.

According to the further characteristics there is also provided a heating radiator for additional heating of the cleaned, styrene-containing air.

According to additional characteristics there is provided an extraction channel or conduit extending to the lower part of the hood for air-conditioning the working space.

Further inportant characteristics relate to openings at a lower part of the hood, preferably provided with sliding doors, so that the openings can be closed for better hardening results.

The following technical advantages are gained by means of the invention.

Requirements for the factory floor area are reduced because the moulds and the products in them are stored for the period of curing in the heated hood, one on top of another. Thus the working, curing and stocking space is combined into one.

Handling costs are saved because the products are manipulated mechanically in the hood by a simple push-button operation.

Curing time for the hardening of the product decreases because the heat of the circulating air can be increased and conducted into the hood where this extra heat speeds up the hardening process.

Further heating costs are decreased because the heated air in the hood is circulated several times. Air-conditioning of the whole factory is arranged through the hood and by intake of the heat, which effects a saving up to 60-80% compared to the customary air-conditioning arrangement.

Still further advantages are gained because working conditions are improved. The vapourized gases such as styrene are effectively eliminated by the air-conditioning system which is individual to each hood and steplessly adjustable. The air flows away from the worker, removing the gases and leaving him outside the vapourized gases as e.g. styrene.

Raw materials and working time are saved through the use of colour, resin and urthane sprays with the novel manufacturing process. The infinitely adjustable exhaust of the vapourized poisonous gases by means of the air-conditioning according to the invention makes it possible to use the sprays safely within the factory space.

Quick mechanical change and transfer of the moulds by means of the device according to the invention results in that production becomes serial in nature. Less time is needed for the training of new workers compared to customary production methods.

Because the products are hardened in the moulds, their shape remains unchanged. In addition, excessive evaporation of styrene is prevented by hardening in the circulating air.

An exemplary embodiment of the present invention is described in the following specification with reference to the attached drawings, in which FIG. 1 is a perspective view showing a line of three devices according to the invention, for making molded boats and the like of reinforced plastic materials, the first device having the front wall partially removed to show the inside arrangement of conveyors;

FIG. 3 is a more detailed end view of the device according to the invention showing a practical arrangement of an exhaust fan and of air pipes;

FIG. 4 is a side view of the device with a partially removed side wall thus showing the arrangement of a conveyor inside the device;

FIG. 5 is a plan view showing a combination of six devices installed and coupled in a series;

FIG. 6 is a perspective view showing the mounting of a mould in the conveyor of the device;

Figure 1:
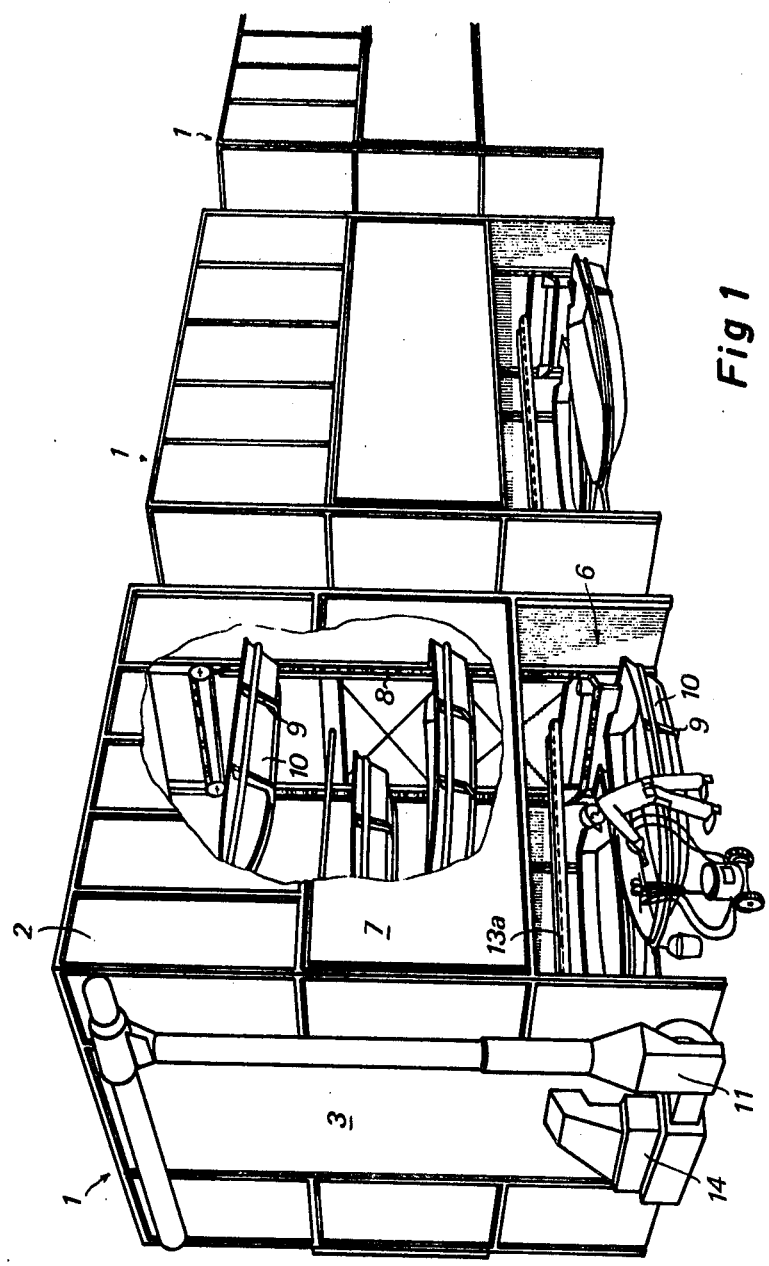

The device according to the invention comprises a housing or hood 1 having side walls 2, end walls 3 as well as a top 4. The construction is made preferably of steel or wooden profiles 5 forming a framework which is then covered by plates of metal, plastic material or fibre material. The joints are made at least nearly gastight. The lower part of the front and rear walls are open from the floor level to the height of about 2 meters to leave access openings 6 for work such as mounting and remounting the moulds, their loading and reloading, changing etc. The openings are also provided with sliding doors 7 (in FIGS. 1 and 2 in the elevated position) which can be closed by pulling them down. Electromechanical means are possibly provided for this purpose.

According to the invention in the inner side of the the housing is mounted a vertical conveyor including of two endless chains 8 or similar means, both of them being mounted on the opposite end sides of the chamber. The conveyor chains 8 are driven synchronously by known techniques, so that both chains are rotated with the same speed. Between these two chains are mounted, with suitable bearings, several supporting frames 9 which are arranged in a horizontal position successively to each other and with equal spaces between each other. These frames 9 are intended to receive moulds 10 for the reinforced plastic products. The moulds are fastened to the frames by means not shown in the drawings. These means can be adjustable to allow moulds of various sizes to be fastened (See FIG. 6). The frames 9 are also provided with tilting means to make the working with the moulds more easy.

Figure 2:
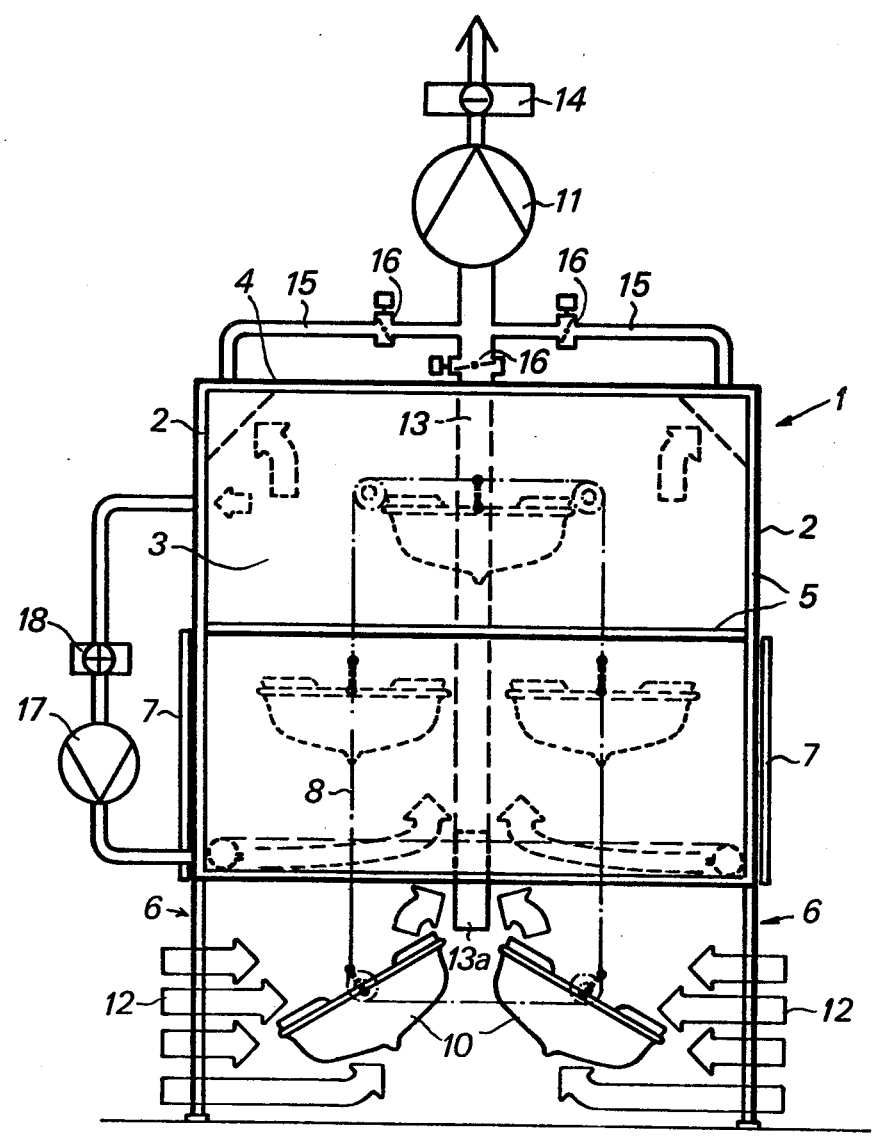
FIG. 2 is a schematical end view of an exemplary embodiment of the device according to the invention.
Figure 7:
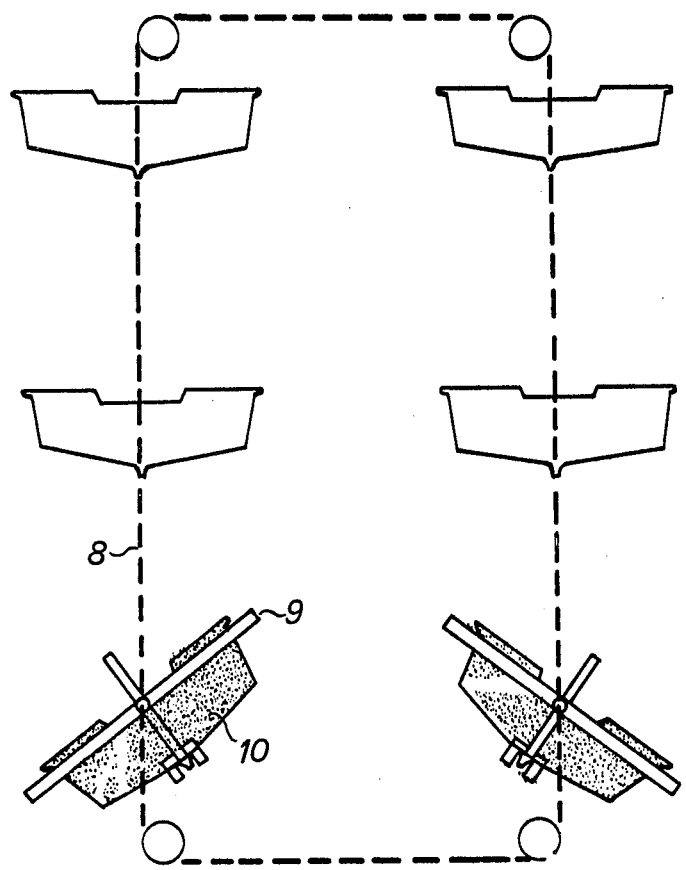
FIG. 7 is a schematical end view showing a tilting possibility of the mould.

When the device according to the invention is used in the production of reinforced plastic products, e.g. small boats, as with the embodiment described, the worker performs the loading of the mould at its lowest position as shown in FIG. 1. This loading is made e.g. by the lamination process or by other suitable method known as such. When the mould is loaded the worker pushes a starting button of the conveyor driving machinery and the conveyor moves a step, after which a new mould comes forth and the first mould moves upwards. The worker performs the loading of the new mould and when this is finished he pushes the push-button again and the conveyor moves forward again a step. The worker continues with the work further until all the moulds are loaded.

The raw material used with the production are generally known plastic material added with hardening substances so that they will self-harden through a known chemical process. In addition there is used a suitable reinforcing material as e.g. glass fibres. The used plastic materials tend to vapourize gases, e.g. styrene, which can be injurious to the health. Therefore the common production procedures need very powerful air conditioning means for the whole factory rooms where this kind of production is performed. This is very uneconomical as already said in the introduction of the description.

The air-conditioning problems are solved according to the present invention so, that the chamber or hood 1 is provided with a particular air-conditioning means which includes a powerful exhaust fan 11. Its maximum power can be e.g. 10000 m$^3$/h. This fan causes a suction effect which collects all the harmful gases from the working place and from around. See FIG. 2, arrows 12. An air suction pipe 13 with its nozzles 13a extends in the chamber 1 to a level corresponding to the workers length.

There is further provided a heat recovery radiator 14 by means of which most of the heat in the exhausted air is recovered and returned to the primary air, thus increasing the economical advantages.

There are also arranged suction pipes 15 through which the fan 11 can exhaust at least a part of the styrene gases evaporated in the chamber 1 from the products which are cured there after the loading of the moulds. The amount of the gases which will be exhausted can be adjusted through the valves 16. To increase the effect of the hardening process there is preferably mounted another fan 17 which circulates the air between upper and lower parts of the chamber through a heating radiator 18. This circulation of the styrene-containing air accelerates the curing and hardening process. This circulation is preferably made steplessly adjustable.

Figure 8:
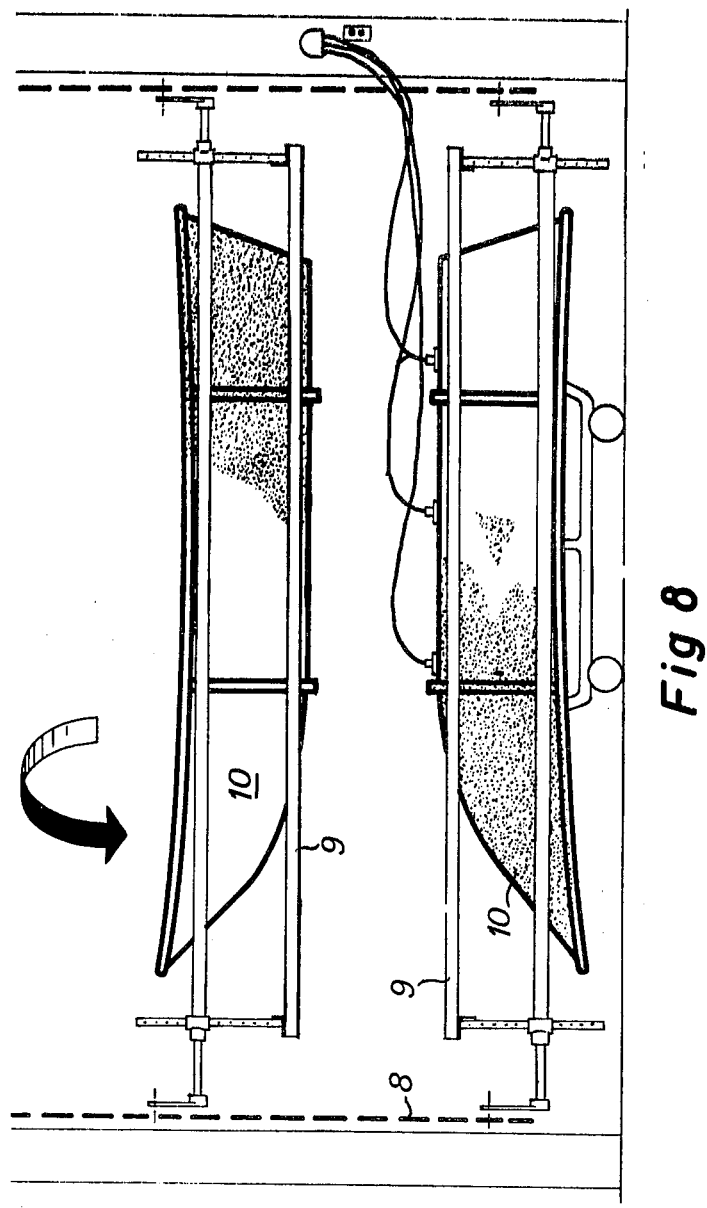
FIG. 8 is a side view showing the removing of a product from the mould.

After a certain time, when the products are fully cured and hardened in the styrene — or other vapourized gas containing atmosphere in the chamber 1, one sliding door at the other side of the chamber is opened and the products can be successively removed from the moulds 10. For this purpose the supporting frames 9 are turned upside down and the product is removed from the molds by means of compressed air and lowered on a particular carriage. See FIG. 8.

Several devices according to the invention can also easily be combined together in a series or a double line as shown in the FIG. 5 (housings 1 are identified).

According to its mode of possible action the device can be called a "carousel."

The device according to the invention can be used for the production of various types of reinforced plastic products. The production methods can be different. The plastic materials can be injected between the two mould halves. Another possible method is a roll-on and a spray method. Further methods which can also be used are the pressing method and the hand lamination method, and using glass fibre mats.

The moulds which are used in the device can be either of the same shape or different. Thus similar or different products can be successively produced by means of the inventive device.

I claim:

1. A device for the production of reinforced molded plastic products such as small boats and the like from raw materials, the device comprising: several mold means (10) mounted on a conveyer (8), for forming the products with hardening and subsequent curing in said mold means, said conveyer being endless and enclosed in an at least partly gas-tight chamber means (1) defined in a housing (2 – 5), with work access openings (6) at least at a lower part of one housing wall (2), thereby providing a working space, said chamber means including means (11) to exhaust gases that evaporate from the raw materials.

2. The device as defined in claim 1, wherein said exhaust means (11) includes an exhaust fan connected by means of a pipe conduit (13) in said chamber means (1) for the exhaustion of gas-containing air from said chamber means.

3. The device as defined in claim 1, wherein said exhaust means (11) includes a heat-recovery radiator (14).

4. The device as defined in claim 1, wherein a part (13a) of a pipe conduit (13) is arranged to exhaust air from a lower part of said chamber means (1), while a separate suction pipe (15) is arranged to exhaust gas-containing air from an upper part of said chamber means.

5. The device as defined in claim 4, further comprising valves (16) for adjusting the amount of the exhausted gases through said pipe conduit (13) and said suction pipe (15).

6. The device as defined in claim 1, further comprising slidable doors (17) for said openings (6) in at least said one wall (2) of said chamber means (1).

7. The device as defined in claim 1, wherein said conveyer (8) includes two endless chain means mounted on the inner side of opposite end walls (3) of said housing (2 – 5) and synchronously driven at substantially the same speed, further comprising successive, equally spaced frames (9) between said chains for supporting said mold means (10).

8. The device as defined in claim 7, further comprising means on said frames (9) for fastening said mold means (10) thereto.

9. The device as defined in claim 8, further comprising means for tilting said frames (9) with respect to said conveyer (8).

10. The device as defined in any one of claims 1 to 20, further comprising means (17, 18) for circulating the gas-containing air between said upper and said lower parts of the chamber means (1).

11. The device as defined in claim 10, wherein said circulating means (17, 18) includes a fan (17) and a heating radiator (18) which later has means for stepless adjustment.

* * * * *